(No Model.) 5 Sheets—Sheet 1.

W. LAHMEYER.
REGULATING APPARATUS FOR ELECTRIC CURRENTS.

No. 449,288. Patented Mar. 31, 1891.

WITNESSES:
Gustave Dieterich
T. F. Bourne

INVENTOR
Wilhelm Lahmeyer
BY Briesen & Steele
ATTORNEYS (No Model.) 5 Sheets—Sheet 2.
W. LAHMEYER.
REGULATING APPARATUS FOR ELECTRIC CURRENTS.
No. 449,288. Patented Mar. 31, 1891.
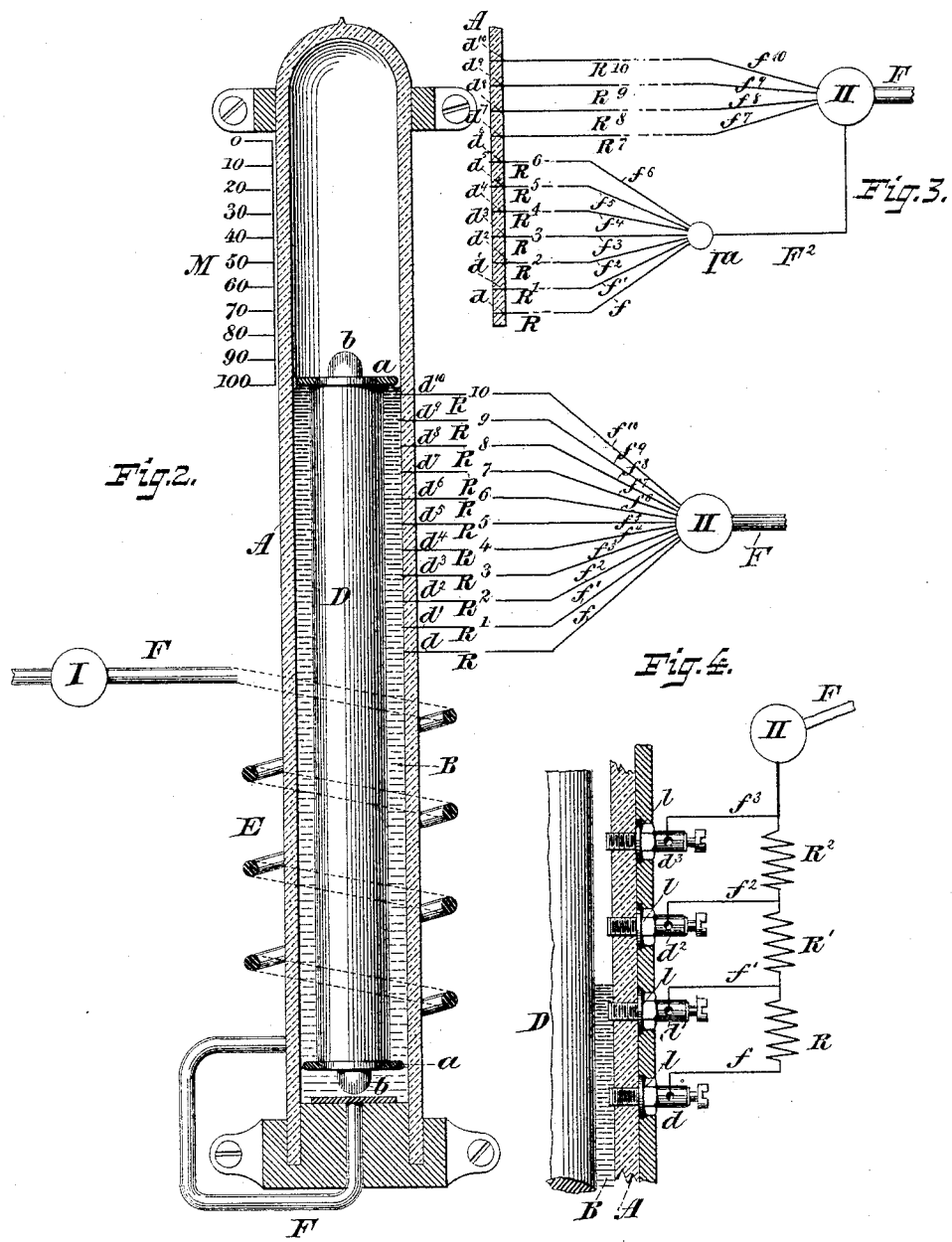
WITNESSES:
Gustave Dieterich
T. F. Bourne.
INVENTOR
Wilhelm Lahmeyer
BY Briesen & Steele
ATTORNEYS (No Model.) 5 Sheets—Sheet 3.
W. LAHMEYER.
REGULATING APPARATUS FOR ELECTRIC CURRENTS.
No. 449,288. Patented Mar. 31, 1891.
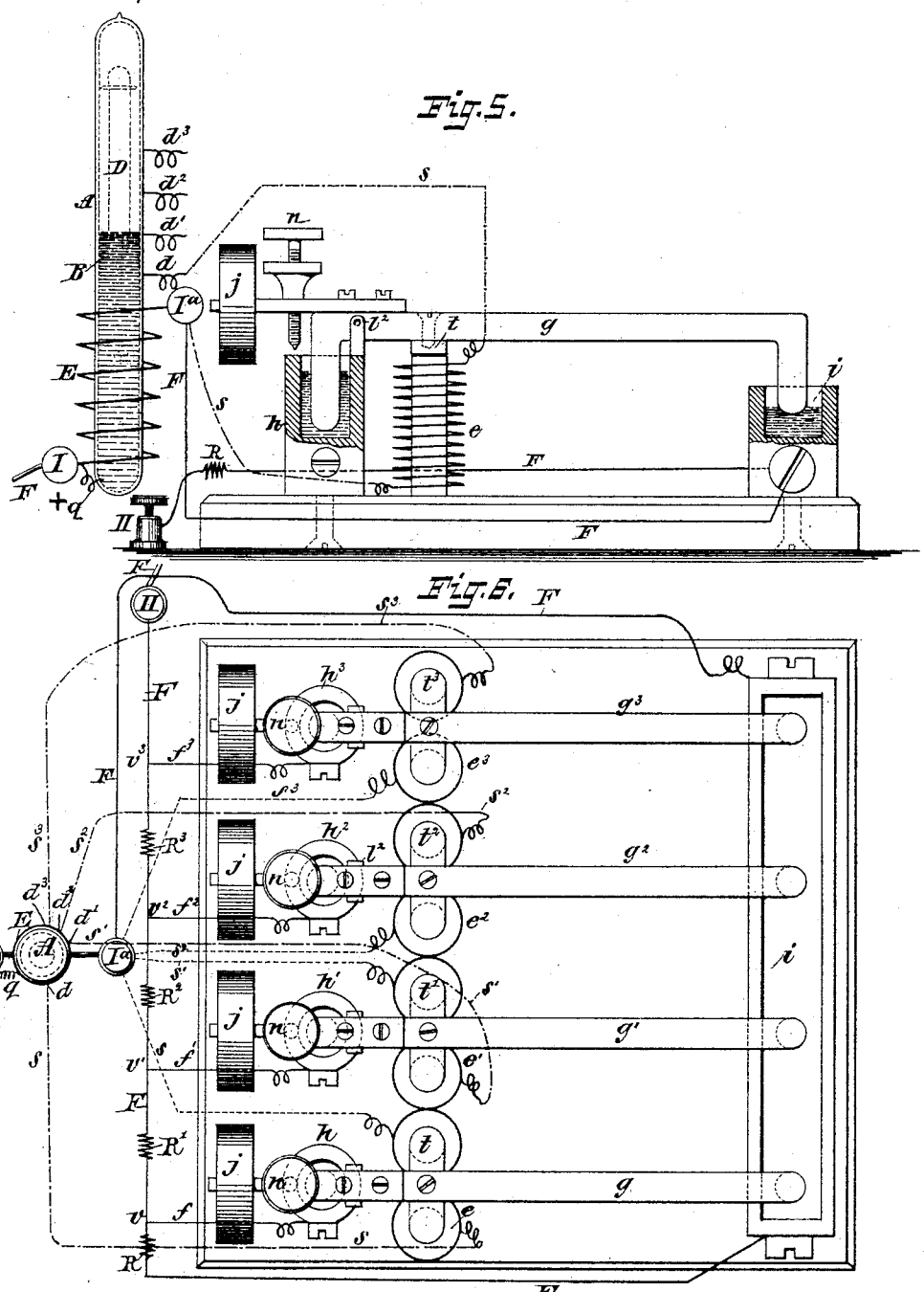

(No Model.)  5 Sheets—Sheet 4.

W. LAHMEYER.
REGULATING APPARATUS FOR ELECTRIC CURRENTS.

No. 449,288.  Patented Mar. 31, 1891.

WITNESSES:
Gustave Dieterich
T. F. Bourne.

INVENTOR
Wilhelm Lahmeyer
BY Briesen & Steele
ATTORNEYS

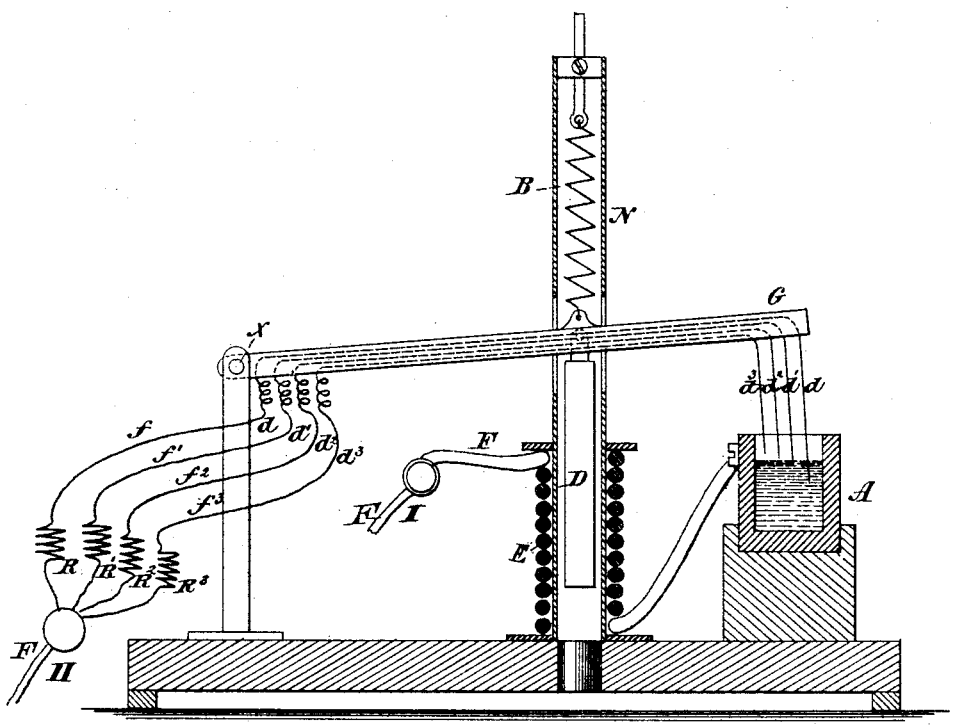

UNITED STATES PATENT OFFICE.

WILHELM LAHMEYER, OF AIX-LA-CHAPELLE, GERMANY.

REGULATING APPARATUS FOR ELECTRIC CURRENTS.

SPECIFICATION forming part of Letters Patent No. 449,288, dated March 31, 1891.

Application filed February 9, 1888. Serial No. 263,496. (No model.) Patented in Germany May 29, 1886, No. 38,671, and in Belgium December 10, 1887, No. 79,866.

*To all whom it may concern:*

Be it known that I, WILHELM LAHMEYER, of Aix-la-Chapelle, Germany, have invented an Improved Apparatus for Regulating Electric Currents, of which the following is a specification.

Reference is to be had to the accompanying drawings, forming part of this specification, in which—

Figure 1:
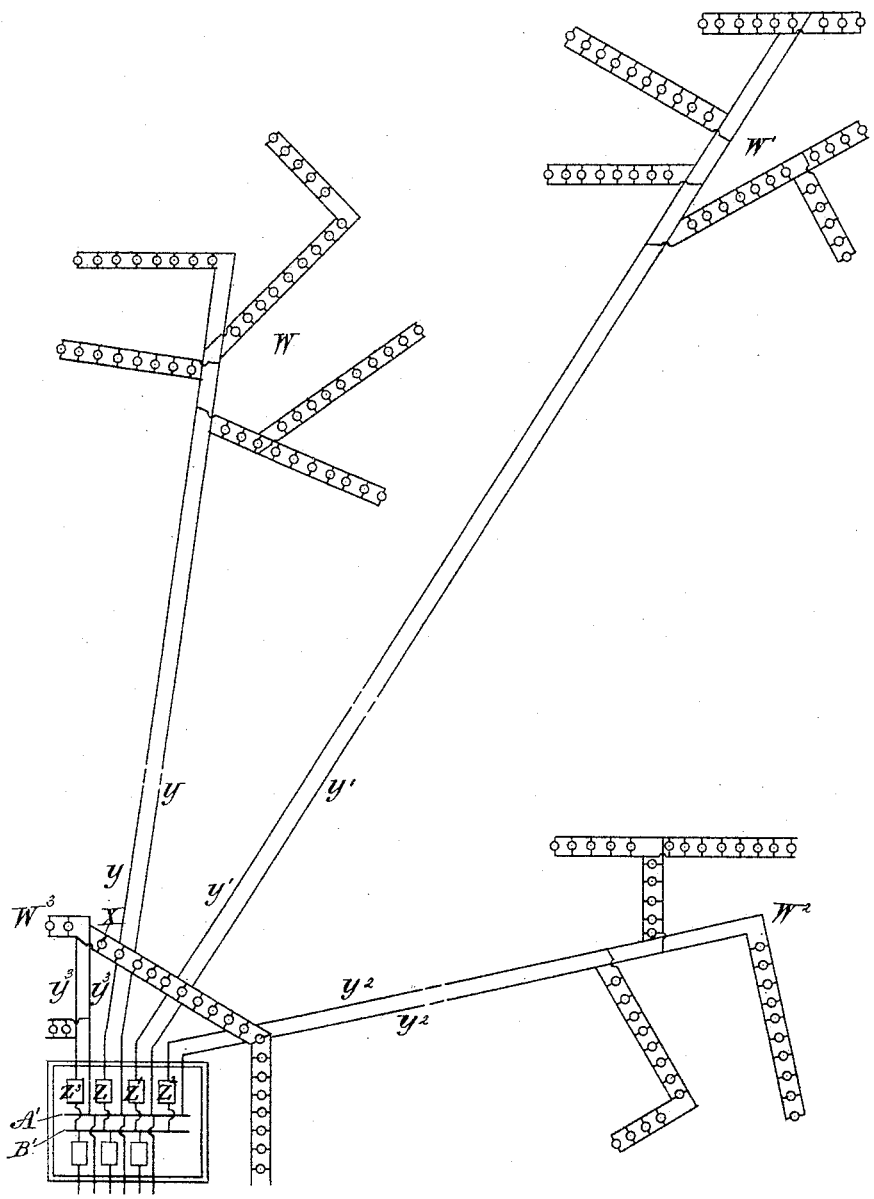
Figure 7:
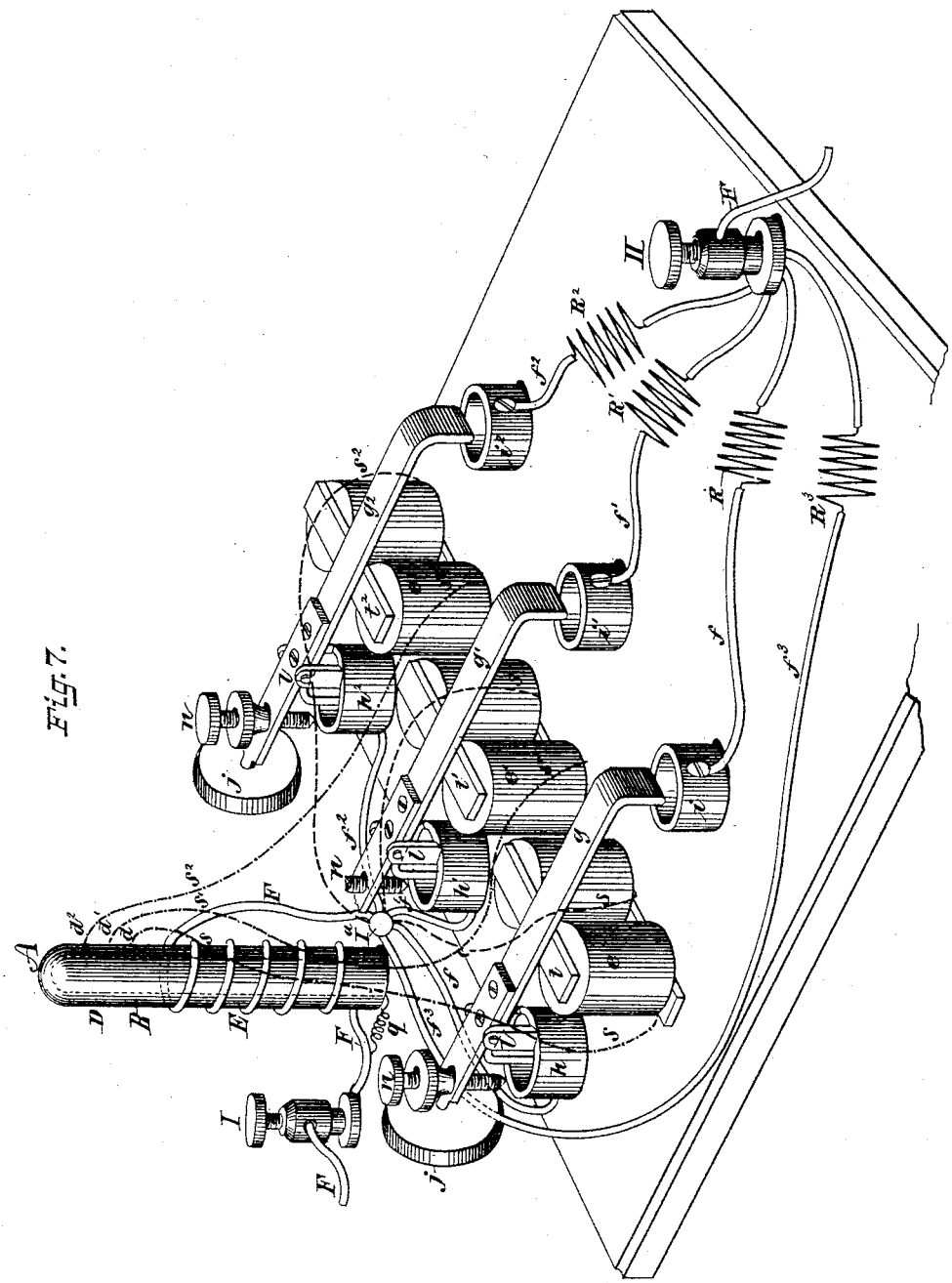

Figure 1 is a conventional view of a system of electric lighting, illustrating the position of my apparatus therein and the application of my invention. Fig. 2 is a vertical section through my apparatus, showing in full the wires and leads. Fig. 3 is a detail view showing a variation in the arrangement of the resistance-coils and connections when said coils are arranged in parallel circuit. Fig. 4 is a detail view showing the arrangement of the resistance-coils in series. Fig. 5 is a side view partly in section and partly in elevation, and Fig. 6 is a plan view, both showing the application of a set of relay or shunt magnets and switches worked thereby to my system of regulation involving resistances arranged in series. Fig. 7 is an isometrical view of the application of a set of relay or shunt magnets and switches worked thereby to my system of regulation involving resistances arranged in parallel. Fig. 8 is a vertical section of a modification of my automatic switch in which the action of a spring is substituted for the flotative action of mercury used in my other form.

When electric lamps are arranged in multiple arc at the end of long lighting-circuits, the adequate regulation of the intensity of the currents presents great difficulties. At the central station it may be assumed that a constant difference of potential is maintained between the two main leads from the dynamo or generating plant by known methods. Then as long as a fixed number of lamps are kept burning upon the given lighting-circuit there will be no trouble in regulating once for all the current received by the lighting-circuit; but when the number of lamps in action varies the strength of current has to be regulated. This is easily managed when proper arrangements can be established in the vicinity of the lamps. If an operative cannot be stationed there, it can be managed by having a special regulating-circuit between the central station and the locality of the lamps; but both these methods are objectionable. One requires an operative to be stationed at a point distant from the central station. The other depends upon a special circuit used for regulating purposes only.

My invention consists in an improved apparatus for regulating, automatically and from the central station, without any special circuit, the intensity of current received by lamps connected at the end of a lighting-circuit of any length of resistance. No resistance-coil arranged on a shunt upon the main lead, as generally employed, is used by me. I introduce more or less resistance in the line itself.

To illustrate the general principles of my invention the diagram shown in Fig. 1 may be referred to. $A'$ and $B'$ represent the two leads of the dynamo, which it may be assumed are maintained at a constant difference of potential. To these the different lines are connected in pairs, as shown, forming the lighting-circuits $y\ y\ y'\ y'\ y^2\ y^2\ y^3\ y^3$. I will confine the discussion to one system marked "W $y\ y$," the identical principles applying to all. At W are shown the lamps arranged in multiple arc, as usual. At Z on this line (and at $Z'\ Z^2\ Z^3$ on the other lines) my apparatus, hereinafter described, is placed. When all the lamps are in circuit and the resistance of the whole system is at a minimum, to maintain the lamps at proper potential the maximum current must pass through the line. If a group of lamps are extinguished, the resistance of the system will be increased and an excess of potential will at once be established for the remaining lamps, and too much current will pass through the system. To express this by Ohm's law, I may call the difference of potential between the terminals of or leads from the dynamo "E." This is constant. It is also evident that a constant difference of potential is to be maintained at the end of the lighting-circuit at the points of connection of the groups of lamps. This I will call "E'." I may call the resistance of the lighting circuit between the central station and the lamps (the resistance of the latter being omitted) "R." This includes my regulator and is a variable quantity. The current passing through the line also is variable, and I may call it "C." Then by Ohm's law I have C R equals E minus E' equals a constant. In other words, to maintain a constant lighting-current at W, where the lamps are situated, the resistance of the line $y\ y$ must vary inversely as the current required, the latter varying directly with the number of lamps employed. If all the lamps are in action, the maximum current will be required and the resistance must be at a minimum. If some are extinguished, less current will be required and the resistance must be increased. My apparatus placed at $Z\ Z'\ Z^2\ Z^3$ effects this automatically. It acts like an amperometer, with the additional function of varying the resistance in inverse proportion to the current passing.

My apparatus is represented in detail in Fig. 2. A closed tube A, of glass, vulcanite, or other impervious and, if desired, insulating substance, is surrounded by a coil of wire E of the main lead F, forming part of the lighting-circuit. I and II represent binding-posts by which the apparatus is connected in direct circuit with the lighting-leads. The tube A is partially filled with mercury B, and in the mercury floats a cylinder or core D, partly or entirely composed of iron, steel, nickel, or some metal attracted by the magnet. The rest of the tube A is filled with nitrogen or other non-corrosive gas or its equivalent—namely, a vacuum may be established therein. This prevents the mercury from being attacked or contaminated. Into the lower end of the tube projects the lead on the main wire F, as shown. In the walls of the tube A a series of wires $f\ f'\ f^2\ f^3$, &c., terminating in contact points or ends $d\ d'\ d^2\ d^3$, &c., of platinum, iron, or other metal not attacked by mercury, are carried, hermetically secured and insulated from each other. These wires $f\ f'$, &c., unite at the binding-post II, and include a definite, invariable, and sufficient resistance $R\ R'\ R^2\ R^3$, &c. The circuit starting from one of the dynamo terminals or leads reaches the binding-post I. Thence it passes by the lead F through the coil E, surounding the tube A, and connects with the mercury within said tube, entering at or near the base of said tube A. Thence by one or more of the contacts $d\ d'$, &c., resistances $R\ R'$, &c., and connecting-wires it goes to the binding-post II, and thence through the line-wire F and lamps and back to the other terminal or lead of the dynamo. The cylinder D floats in the mercury. The apparatus is so adjusted that when no current is passing the level of the mercury will be such that only one contact $d$ will be below the surface and thus in contact with the mercury. When a current passes through the coil, the cylinder D by the magnetic force is drawn downward in proportion to the strength of said current. As it descends, the level of the mercury in the tube A rises, thus immersing in succession the different contacts $d\ d'\ d^2$. As each wire embodies a definite resistance, it is evident that the resistance of the apparatus will be at a maximum when no current is passing; that as a current passes it will decrease the resistance by bringing more of the wires $f\ f'$, &c., into parallel circuit, and with them the resistances $R\ R'$, &c., and that a maximum current, by bringing all the wires into circuit, will produce a minimum resistance. The floating cylinder D is provided at top and bottom with guide-plates $a\ a$, preferably star-shaped, and india-rubber buffers or cushions $b\ b$. A scale may be provided, as at M, if the tube is of glass, by which the height of the float can be determined. If the tube A is of non-transparent material, a glass window is put in the tube, on which the scale may be marked. The graduation of the scale may be a matter of calculation or may be empirically executed, and either course may be followed in determining the general proportions of parts.

In Fig. 3 is shown a modified arrangement of resistances. A certain number of the wires—say $f'$, &c., to $f^6$, from the contacts $d$ to $d^6$, with their resistances $R\ R^6$—are connected to the intermediate binding-post $I^a$, whence a wire $F^2$ of sufficient size goes to the second binding-post II. The wires $f^7$, &c., to $f^{10}$ are connected directly to the main binding-post II, and are insulated from each other, and may be united into a cable, if desired. This arrangement makes some of the resistances of the wires $f$ to $f^6$ depend upon the coils R to $R^6$ almost exclusively, while the other resistances are in great part due to the straight lines of wire, if necessary, secondary resistance-coils $R^7$ to $R^{10}$ being also introduced, if desired. Instead of varying the resistance as just described, by throwing more or less given resistances into parallel or multiple circuits, my apparatus may be arranged to throw resistances directly into the line. This is shown in Fig. 4. In said figure, A represents the tube, B the mercury, and D the floating cylinder. The current, as before described, passes through a wire coiled around the lower part of the tube, (not included in the figure,) then through the mercury B, and out by one or more of the binding-posts, wires, or contacts $d\ d'\ d^2\ d^3$, &c. If owing to the passing of a slight current the level of the mercury is so low that the contact $d$ only is immersed, the current has to pass through the three resistance-coils $R\ R'\ R^2$. If as more current passes the mercury rises so that the end of $d'$ is immersed, as shown in the figure, then the resistance-coil R is cut out by being short-circuited, and the current has only to pass through the coils $R'$ and $R^2$. In like manner further increase in the strength of current may short-circuit $R'$ and $R^2$ in succession. This construction produces the same result as that produced by the first-described arrangement, causing the resistance to vary inversely with the strength of current.

In Fig. 4, moreover, are shown the connections when the tube A is of vulcanite or gutta-percha, which I recommend in preference to glass for heavy currents. The contacts $d$ $d'$, &c., are made in the form of screws, secured as shown, leather washers $l$ being placed beneath their flanges. Where a large number of contacts is required, they may be arranged in a spiral, so as to obtain room for the wires and connections.

In Figs. 5 and 6 is shown a modification of my system, in which weak currents on shunt-circuits are made to work a series of relays which operate precisely in accord with the principles already utilized to increase or decrease the resistance of the lighting-circuit. The tube A, with its floating cylinder D, mercury B, and multiple contacts $d$ $d'$ $d^2$, &c., is shown. The line F, coming from the dynamo terminal or lead, reaches the system at the post I and is carried in a coil E around the tube A to $I^a$. When no current is passing, all the multiple contacts are broken, the level of the mercury being below all. Near the tube a series of magnets $e$ $e'$ $e^2$ $e^3$, and their armatures $t$ $t'$ $t^2$ $t^3$, with oscillating bars $g$ $g'$ $g^2$ $g^3$, secured to said armatures are carried. The bars $g$ $g'$ $g^2$ $g^3$ are pivoted, as at $l^2$, and carry adjusting-screws $n$ and weights $j$ or equivalent springs. At one end the bars $g$, &c., always dip into separate mercury-cisterns $h$ $h'$ $h^2$ $h^3$, and beneath their other ends is a single mercury-cistern $i$ or several connected by leads, into which the bars dip only when depressed. A small shunt-lead $q$ starts from the post I of the main lead F, connecting the same with the mercury in the tube A. From contacts $d$ $d'$ $d^2$ $d^3$ small wires $s$ $s'$ $s^2$ $s^3$ run to the magnets $e$ $e'$ $e^2$ $e^3$, respectively, connecting with one terminal of their exciting-coils. The other ends of their coils are connected to another portion of the main lighting-circuit $I^a$ by said connecting-wires $s$ $s'$ $s^2$ $s^3$. Thus as the mercury rises and increased strength of current draws the float or cylinder D downward, and the mercury makes contact with the points $d$ $d'$ $d^2$ $d^3$, the magnets are successively excited, causing the outer ends of the levers $g$ $g'$, &c., to dip into the common mercury-cistern $i$. The main lighting-circuit has been traced around the tube A to $I^a$. Thence it passes by the wire F to the mercury-trough $i$ at one of its ends or other convenient place. From the other end or other point of the trough $i$ the circuit leads to the resistances R R' $R^2$ $R^3$, connected in series. The current passes through these resistances and to the binding-post II, and thence to the main line F, and ultimately, after supplying the lamps, returns to the other dynamo terminal or lead. From points $v$ $v'$ $v^2$ $v^3$ between the resistances R R', &c., wires $f$ $f'$ $f^2$ $f^3$ run to the mercury-cisterns $h$ $h'$ $h^2$ $h^3$, respectively. When the contact $d$ is immersed, the magnet $e$ is excited, and its armature-bar $g$ is drawn down and, dipping into the cistern $i$, short-circuits the resistance R. In like manner the other resistances R' $R^2$ $R^3$ are short-circuited each by the immersion of the contact-point corresponding to the particular magnet. This arrangement embodies the use of resistance-coils in series. A similar arrangement of relay-magnets can be applied to operating parallel resistances.

In Fig. 7 of the drawings is shown a modification of the relay system, in which the parallel arrangement of resistances is adopted instead of the series, as in Figs. 5 and 6. In this figure is represented my automatic switch, consisting of the tube A, containing a float D and mercury B, and with any given number of insulated contacts $d$ $d'$ $d^2$, &c. At I is one of the main binding-posts. The main wire starting therefrom winds in a coil E around the tube A, so as to act upon the polarizable float, as already described. Thence the main wire goes to the point $I^a$, where it branches into a number of divisions $f$ $f'$ $f^2$ $f^3$, one greater than the number of the contact-points $d$ $d'$ $d^2$. A series of magnets $e$ $e'$ $e^2$, &c., each provided with armatures $t$ $t'$ $t^2$ and swinging or oscillating bars $g$ $g'$ $g^2$ attached thereto, are provided, one less in number than the branches of the main wire.

The exciting-circuits for the magnets are arranged as follows: A small shunt $q$ connects with the mercury within the tube A. At $d$, $d'$, and $d^2$ on said tube the insulated contacts are arranged as already described. From each contact a wire $s$ $s'$ $s^2$ is carried to each magnet $e$ $e'$ $e^2$, and the return-wires $s$ $s'$ $s^2$ from the magnets are connected to any convenient part of the main wire, as at $I^a$. As each contact is immersed in the mercury the magnet corresponding thereto becomes excited, and the magnet is by such immersion of the contact-point brought into a shunt-circuit from the main lead. Thus when the contact $d$ is immersed in the mercury the current entering the mercury at the base of the tube A by the wire $q$ passes by the wire $s$ to the magnet $e$, excites the same, and returns by $s$ to the point $I^a$ or elsewhere. At each end of each oscillating bar $g'$, &c., there are individual mercury-cups $h$ $h'$ $h^2$ and $i$ $i'$ $i^2$. The armature-bars $g$ $g'$, &c., are so arranged as always to dip at one end into one set of cups $h$ $h'$ $h^2$, &c., while their other ends dip into the other cups $i$ $i'$ $i^2$, &c., only when the armatures are drawn down by the magnets $e$, &c. To each mercury-cup $h$, &c., one of the branches $f$ $f'$ $f^2$ of the main wire F is connected. Continuations of the leads $f$ $f'$ $f^2$ lead from the other mercury-cups $i$ $i'$ $i^2$ to a second binding-post II. A shunt of the main circuit $f^3$ leads from the point $I^a$ to the binding-post II. This wire $f^3$ and the other wires $f$ $f'$ $f^2$, starting from the mercury-cups $i$ $i'$ $i^2$, include in their course resistances R R' $R^2$ $R^3$. When none of the magnets are excited, it is obvious that all the current must go through the resistance $R^3$ by the lead $f^3$. If but one of the armatures—that belonging to the magnet $e$—is depressed or drawn down by the magnet, the free end will dip into its mercury-cistern $i$. This action will complete the connection of the branch $f$ from $I^a$, and immediately part of the current will flow through the resistance R. If this resistance R is equal to the resistance $R^3$, then, as the two are in parallel, the total resistance will be halved. When the other magnets act upon their armatures through the rising of the mercury, the other resistances will immediately be thrown into parallel circuit and the total resistance will progressively diminish.

In Fig. 8 is shown a system of relays in which the elastic action of a spiral spring B is substituted for the flotative effect of the mercury. The cylinder D, of iron or other suitable material, is drawn upward by the spring B within the tube-support or suitable frame N. The cylinder D is inclosed within a coil E, through which the current passes, and is suspended from a lever G, pivoted, as at $x$. At one end of the lever are placed contact-wires of graduated length $d\ d'\ d^2\ d^3$. When a current passes through the coil and draws the lever down, these contact-points are successively immersed in a cup A containing mercury. The other wires and connections are similar to those already described.

This apparatus may be arranged in a divided shunt-circuit and operate a series of magnets with armatures and vibrating contact-bars, as shown in Figs. 5 and 6, or may be arranged directly in the circuit and operate to decrease resistance by throwing resistance-coils successively into parallel circuit, as shown in Figs. 2 and 8. The core or cylinder D may be of prismatic, oval, or other form. If a shunt-wound dynamo is used at the central station, then the same arrangement can be made to act upon the resistance-box of the dynamo, so as to regulate the current by varying the strength of the field-magnets.

Although I have shown different numbers of contact points and wires, any desired number may be used, and I therefore do not limit myself to the number herein shown.

Having now described my invention, what I claim is—

1. An electric apparatus consisting of a cistern A of mercury, floats D, and multiple contacts $d\ d'$, combined with the series of relays arranged on high-resistance shunts, successively thrown into action by varying strength of current in the main lead, and by their action throwing into the main circuit one by one a series of resistances, so as to cause the resistance of the main lead to diminish as the strength of current increases, and the reciprocal, substantially as herein shown and described.

2. The combination of the cistern A and mercury B with the float D, having guide-plates $a$ and buffers $b$, substantially as described.

3. The combination of the cistern A, mercury B, float D, having guide-plates $a$ and buffers $b$, and sets of resistances R R', &c., as specified.

4. The combination, with the cistern A, mercury B, float D, and conductors $d\ d'$, &c., entering the vertical wall of said cistern, of a series of magnets $e\ e'$, &c., in shunt-circuits, arranged to operate a series of levers $g\ g'$, &c., a series of resistance-coils R R', &c., and the levers $g\ g'$, &c., all arranged substantially as herein shown and described, so that each lever when depressed will short-circuit a corresponding resistance-coil, thus diminishing the resistance of the main circuit, substantially as set forth.

In testimony whereof I have signed my name to this specification in the presence of two subscribing witnesses.

WILHELM LAHMEYER.

Witnesses:
CARL EGGERSMANN,
WILH. NEURATH.